US011797513B2

(12) United States Patent
Kim et al.

(10) Patent No.: US 11,797,513 B2
(45) Date of Patent: Oct. 24, 2023

(54) DATA LOADING AND PROCESSING SYSTEM, AND METHOD THEREFOR

(71) Applicants: BCORE, Seoul (KR); Young Min Kim, Seoul (KR)

(72) Inventors: Young Min Kim, Seoul (KR); Woo Suk Jeong, Seoul (KR); Ji Young Park, Seoul (KR)

(73) Assignees: BCORE, Seoul (KR); Young Min Kim, Seoul (KR)

( * ) Notice: Subject to any disclaimer, the term of this patent is extended or adjusted under 35 U.S.C. 154(b) by 0 days.

(21) Appl. No.: 17/921,284

(22) PCT Filed: May 26, 2021

(86) PCT No.: PCT/KR2021/006535
§ 371 (c)(1),
(2) Date: Oct. 25, 2022

(87) PCT Pub. No.: WO2021/242000
PCT Pub. Date: Dec. 2, 2021

(65) Prior Publication Data
US 2023/0122194 A1    Apr. 20, 2023

(30) Foreign Application Priority Data

May 27, 2020  (KR) .......................... 10-2020-0063875

(51) Int. Cl.
G06F 16/23    (2019.01)
G06F 16/22    (2019.01)
G06F 16/25    (2019.01)

(52) U.S. Cl.
CPC ...... *G06F 16/2358* (2019.01); *G06F 16/2282* (2019.01); *G06F 16/2365* (2019.01); *G06F 16/252* (2019.01)

(58) Field of Classification Search
CPC ............. G06F 16/2358; G06F 16/2282; G06F 16/2365; G06F 16/252
(Continued)

(56) References Cited

U.S. PATENT DOCUMENTS 6,519,601 B1 *  2/2003  Bosch ................. G06F 16/2282
707/999.102
7,539,702 B2    5/2009  Deshmukh et al.
(Continued)

FOREIGN PATENT DOCUMENTS

JP    2016-536690 A    11/2016
KR    10-2018-0024367 A    3/2018
(Continued)

OTHER PUBLICATIONS

International Search Report for PCT/KR2021/006535 dated Sep. 1, 2021.
Office Action for KR 10-2020-0063875 dated Aug. 7, 2020.

*Primary Examiner* — Shahid A Alam
(74) *Attorney, Agent, or Firm* — Sughrue Mion, PLLC

(57) ABSTRACT

A data loading and processing system, and a method therefor are disclosed. In the present invention, a collection server confirms the state of target resources before collecting data, determines a data collecting and loading method for the corresponding resources on the basis of the confirmed state of the resources, transmits a data collection request to a data server, collects the data from the data server through the determined data collecting and loading method, and loads the collected data in a big data platform so as to collect and load data by an optimum data collecting and loading method according to the current state of objects to be collected and objects to be loaded, and thus can increase overall system operation efficiency.

8 Claims, 11 Drawing Sheets

(58) Field of Classification Search
USPC .......................................................... 707/722
See application file for complete search history.

(56) References Cited

U.S. PATENT DOCUMENTS

| | | | |
|---|---|---|---|
| 2003/0050960 A1* | 3/2003 | Kawamura | H04L 67/34 |
| | | | 709/213 |
| 2009/0037501 A1* | 2/2009 | Nishiyama | G06F 12/0269 |
| 2009/0055507 A1* | 2/2009 | Oeda | G06F 9/4856 |
| | | | 709/216 |
| 2016/0239746 A1* | 8/2016 | Yu | G06N 20/00 |
| 2017/0006135 A1* | 1/2017 | Siebel | G06Q 10/06 |
| 2017/0126568 A1* | 5/2017 | Lee | H04L 43/0817 |
| 2018/0069925 A1* | 3/2018 | Lavasani | G06F 16/28 |
| 2018/0287902 A1* | 10/2018 | Chitalia | G06F 11/3433 |
| 2021/0312677 A1* | 10/2021 | Albrecht | H04W 4/021 |

FOREIGN PATENT DOCUMENTS

| | | |
|---|---|---|
| KR | 10-2018-0078994 A | 7/2018 |
| KR | 10-1874484 B1 | 7/2018 |
| KR | 10-1966201 B1 | 4/2019 |
| KR | 10-2013149 B1 | 8/2019 |
| KR | 10-2188132 B1 | 12/2020 |

* cited by examiner

TYPE 1 : Fulldump

TYPE 2A : Append

TYPE 2B : Update

TYPE 3A : Partition Append

TYPE 3B : Partition Update

TYPE 4 : Partition And Remove

TYPE 5 : Partition and Complex

LOAD HANDLING METHOD (UPDATE SUPPORTED)

LOAD HANDLING METHOD (DELETE SUPPORTED)

DATA LOADING AND PROCESSING SYSTEM, AND METHOD THEREFOR

TECHNICAL FIELD

The present invention relates to a data loading and processing system and a method thereof, and more particularly, to a data loading and processing system, in which a collection server checks a state of a target resource before collecting data, determines a data collecting and loading mode for the corresponding resource on the basis of the checked state of the resource, transmits a data collection request to a data server, collects data from the data server in the determined data collecting and loading mode, and loads the collected data in a big data platform, and a method thereof.

BACKGROUND ART

Big data refers to a large amount of data that is difficult to collect, store, analyze, and the like in existing databases.

Such big data requires additional resources to collect, store, and analyze data that is generated by a plurality of users, and requires a platform for storing and analyzing data as well as collecting data.

DISCLOSURE

Technical Problem

The present invention is directed to providing a data loading and processing system, in which a collection server checks a state of a target resource before collecting data, determines a data collecting and loading mode for the corresponding resource on the basis of the checked state of the resource, transmits a data collection request to a data server, collects data from the data server in the determined data collecting and loading mode, and loads the collected data in a big data platform, and a method thereof.

Technical Solution

One aspect of the present invention provides a data loading and processing system including a data server that is included in a resource and is a target from which data is collected; a big data platform that is included in the resource and is a target into which data is loaded; and a collection server configured to check states including usage of a resource and a data amount, determine a data collecting and loading mode for the data server and the big data platform on the basis of the checked states of the resource, transmit a data collection request to the data server, collect data from the data server in a preset collection area of the collection server in the determined data collecting and loading mode, and load the collected data into the big data platform on the basis of the determined data collecting and loading mode.

The collection server may check usage of the data server, a data amount of the data server, and usage of the big data platform.

The collection server may load the collected data into at least one of a disk and a memory included in the big data platform on the basis of the determined data collecting and loading mode.

In the case in which an update function or a query is not supported when the collection server loads the collected data into the big data platform, the collection server may join data in a final loading area of the big data platform and the collected data, generate data in a new partition, and replace and load the generated data in the new partition into the big data platform.

In the case in which a delete function or a query is not supported when the collection server loads the collected data into the big data platform, the collection server may replace and load data newly collected by the collection server into a corresponding partition of the big data platform.

Another aspect of the present invention provides a data loading and processing method including checking, by a collection server, states including usage of a resource and a data amount; determining, by the collection server, a data collecting and loading mode for a data server and a big data platform on the basis of the checked states of the resource; transmitting, by the collection server, a data collection request to the data server; receiving, by the data server, the data collection request transmitted from the collection server and storing the received data collection request; collecting, by the collection server, data from the data server in a preset collection area of the collection server in the determined data collecting and loading mode; and loading, by the collection server, the collected data into the big data platform on the basis of the determined data collecting and loading mode.

In the determining of the data collecting and loading mode for the data server and the big data platform, any one data collecting and loading mode may be determined from among a plurality of preset data collecting and loading modes according to the checked data amount and whether the data is allowed to be divided into units of partitions.

The data collecting and loading mode may be any one of a preset type 1, type 2A, type 2B, type 3A, type 3B, type 4, and type 5, the type 1 may be a mode in which all data of the data server is collected in the preset collection area of the collection server, existing data in a final loading area of the big data platform is deleted, and then the collected data is loaded into the big data platform, the type 2A may be a mode in which only newly appended data of the data server is collected in the collection area of the collection server, and the collected data is appended and loaded into the final loading area of the big data platform, the type 2B may be a mode in which only appended or modified data of the data server is collected in the collection area of the collection server, and the collected data is loaded into the final loading area of the big data platform using a preset primary key so as not to overlap basic data in a completion table included in the resource, the type 3A may be a mode in which a target area is composed of partitions, only data corresponding to a partition, in which appended data is present, among the partitions of the data server, is collected in the collection area of the collection server, and the collected data is appended and loaded into the final loading area of the big data platform, the type 3B may be a mode in which the target area is composed of partitions, only data corresponding to a partition, in which appended or modified data is present, among the partitions of the data server, is collected in the collection area of the collection server, and the collected data is loaded into a partition in the final loading area of the big data platform using the primary key so as not to overlap the existing data in the final loading area of the big data platform, the type 4 may be a mode in which the target area is composed of partitions, data corresponding to a partition, in which append or modification occurs, among the partitions of the data server, or data corresponding to a partition, in which deletion occurs, among the partitions of the data server, is collected in the collection area of the collection server, an amount of data in the final loading area of the big data platform is checked, and when the checked amount of data in the final loading area of the big data platform is smaller than a preset reference value, the collected data is overwritten and loaded into the existing partition in the final loading area of the big data platform, and the type 5 may be a mode in which data corresponding to a partition, in which append or modification occurs, among the partitions of the data server, or data corresponding to the partition, in which deletion occurs, among the partitions of the data server, is collected in the collection area of the collection server, an amount of data in the final loading area of the big data platform is checked, and when the checked amount of data in the final loading area of the big data platform is greater than or equal to a preset reference value, some pieces of data of the collected data are loaded into the final loading area of the big data platform as the type 3B, and the remaining pieces of data of the collected data are loaded into the final loading area of the big data platform as the type 4.

The collecting of the data from the data server in the preset collection area of the collection server in the determined data collecting and loading mode may include at least one of a process of collecting a plurality of pieces of data stored in a database management system (DBMS) included in the data server using java database connectivity (JDBC) or open database connectivity (ODBC), which is preset, in the determined data collecting and loading mode; a process of collecting logs and files stored in the data server using at least one of the file transfer protocol (FTP), an open source, and an agent, which are preset, in the determined data collecting and loading mode; and a process of collecting pieces of web data using web crawling in the determined data collecting and loading mode.

The loading of the collected data into the big data platform on the basis of the determined data collecting and loading mode may include, in the case in which an update function or a query is not supported when the collection server loads the collected data into the big data platform, a process of joining, by the collection server, data in a final loading area of the big data platform and the collected data and generating data in a new partition; and a process of replacing and loading the generated data in the new partition into the big data platform.

Advantageous Effects

According to the present invention, a collection server can check a state of a target resource before collecting data, determine a data collecting and loading mode for the corresponding resource on the basis of the checked state of the resource, transmit a data collection request to a data server, collect data from the data server in the determined data collecting and loading mode, and load the collected data into a big data platform, and thus the data can be collected and loaded by the optimal data collecting and loading mode in accordance with current states of a target to be collected and a target to be loaded so as to enhance the operation efficiency of the entire system.

BEST MODE OF THE INVENTION

Figure 1:
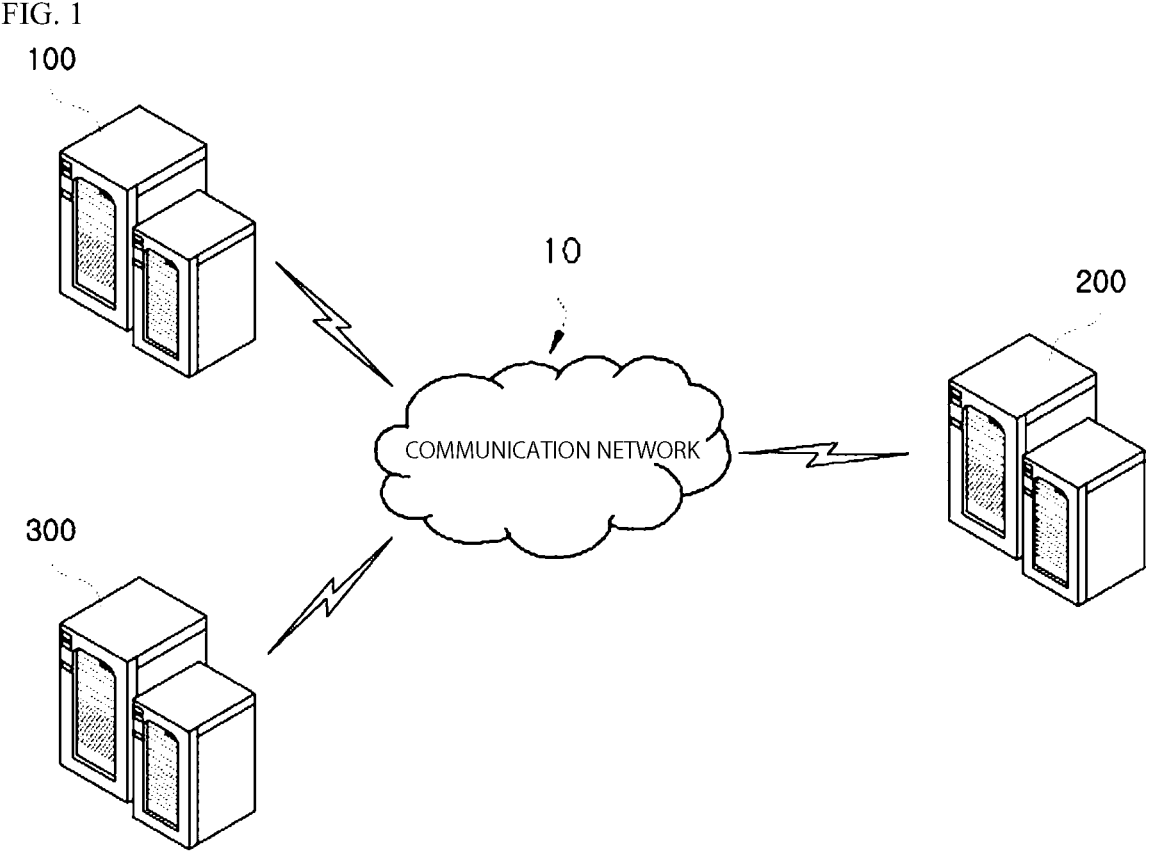
FIG. 1 is a block diagram illustrating a configuration of a data loading and processing system according to an embodiment of the present invention.

It should be noted that the technical terms used herein are for the purpose of describing specific embodiments only and are not intended to be limiting to the present invention. Further, unless otherwise defined in the present invention, the technical terms used herein should be interpreted in meanings generally understood by those skilled in the art, and should not be interpreted in an excessively comprehensive meaning or in an excessively reduced meaning. Further, when the technical term used herein is an incorrect technical term that does not accurately express the spirit of the present invention, it should be understood by being replaced with a technical term that can be correctly understood by those skilled in the art. Further, the general terms used herein should be interpreted as defined in advance or according to the context before and after, and should not be interpreted in an excessively reduced meaning.

Further, as used herein, the singular forms "a" and "an" are intended to also include the plural forms, unless the context clearly indicates otherwise. The terms "comprise," "comprising," "include," and/or "including," when used herein, should not be construed as necessarily including all of the various components or various steps described in the present invention, and should be construed that some components or some steps may not be included or additional components or steps may be included.

Further, it should be understood that, although the terms including ordinal numbers such as "first," "second," and the like may be used herein to describe components, the components are not limited by the terms. The terms are only used to distinguish one component from another component. For example, a first component could be called a second component, and, similarly, a second component could be called a first component, without departing from the scope of the present invention.

Hereinafter, exemplary embodiments will be described in detail with reference to the accompanying drawings, the same or similar components are denoted by the same reference numerals regardless of reference numbers, and thus the description thereof will not be repeated.

Further, in descriptions of the present invention, when detailed descriptions of related known configurations or functions are deemed to unnecessarily obscure the gist of the present invention, they will be omitted. Further, it should be noted that the accompanying drawings are only examples to facilitate overall understanding of the spirit of the present invention, and the technological scope disclosed in this specification is not limited to the accompanying drawings.

FIG. 1 is a block diagram illustrating a configuration of a data loading and processing system 10 according to an embodiment of the present invention.

As illustrated in FIG. 1, the data loading and processing system 10 includes a data server 100, a big data platform 200, and a collection server 300. Not all of the components of the data loading and processing system 10 illustrated in FIG. 1 are essential components, and the data loading and processing system 10 may be implemented using more components than those illustrated in FIG. 1 or may be implemented using fewer components than those illustrated in FIG. 1.

Each of the data server 100, the big data platform 200, and the collection server 300 may include a communication unit (not illustrated) for performing a communication function with other terminals, a storage unit (not illustrated) for storing various types of information and various programs (or applications), a display unit (not illustrated) for displaying various types of information and various results of executing programs, a voice output unit (not illustrated) for outputting voice information corresponding to the various types of information and various results of executing programs, a control unit (not illustrated) for controlling various components and functions of each terminal, and the like.

The data server 100 communicates with the big data platform 200, the collection server 300, and the like.

Further, the data server 100 may be implemented in the form of a web server, a database server, a proxy server, or the like. Further, a network load balancing mechanism, or one or more types of software among various types of software that are operated by the data server 100 on the Internet or another network, may be installed in the data server 100, and the data loading and processing system 10 may be implemented as a computerized system through the installed network load balancing mechanism or one or more types of software. Further, a network may be a Hypertext Transfer Protocol (HTTP) network, or may be a private line, an intranet, or any other network. Furthermore, the data server 100 and other servers/terminals may be connected through a secure network to prevent data from being attacked by any hackers or other third parties. Further, the data server 100 may include a plurality of database servers, and may be implemented in a manner that the database servers are separately connected to the data server 100 through an arbitrary type of network connection including a distributed database server architecture.

Further, the data server 100 includes (or is configured of) a central processing unit (CPU) (not illustrated), a disk (not illustrated), a memory (not illustrated), a database management system (DBMS) (not illustrated), and the like. Here, the DBMS stores (or manages) a plurality of pieces of data (or tables) collected from various servers and/or devices.

Further, before the collection server 300 attempts a process for collecting one or more pieces of data (or tables) stored in the data server 100, the data server 100 receives a data collection request transmitted from the collection server 300.

Further, the data server 100 stores the received data collection request.

Further, when the collection server 300 attempts to collect the data stored in the data server 100 on the basis of the received data collection request, the data server 100 allows access of the corresponding collection server 300.

The big data platform 200 communicates with the data server 100, the collection server 300, and the like.

Further, the big data platform 200 is a big data server, and includes (or is configured of) a CPU (not illustrated), a disk (not illustrated), a memory (not illustrated), a DBMS, and the like.

Further, the data, which is collected by the collection server 300 from the data server 100 in the determined data collecting and loading mode, is loaded in the big data platform 200.

That is, the big data platform 200 is linked with the collection server 300 to load the data which is collected by the collection server 300 from the data server 100 on the basis of the determined data collecting and loading mode into the disk and/or memory included in the big data platform 200.

The collection server 300 communicates with the data server 100, the big data platform 200, and the like.

Further, the collection server 300 includes (or is configured of) a CPU (not illustrated), a disk (not illustrated), a memory (not illustrated), a DBMS, and the like.

Further, the collection server 300 checks the usage of the data server 100 and the big data platform 200 that are target resources, and a data amount of the data server 100. Here, the resources indicate the usage of the data server 100 that is a target from which data is collected, the usage of the big data platform 200 that is a target into which data is loaded, and a data amount of the target from which data is collected.

That is, the collection server 300 checks states including the usage of at least one of the CPU, the disk, and the memory which are included in each of the data server 100 and the big data platform 200.

Further, the collection server 300 checks a state including the data amount of the data server 100.

Further, the collection server 300 determines a data collecting and loading mode for the data server 100 and the big data platform 200 on the basis of the checked states of the resources (e.g., the usage of the data server 100, the usage of the big data platform 200, the data amount of the data server 100, etc.).

That is, the collection server 300 determines (or selects) any one data collecting and loading mode from among a plurality of preset data collecting and loading modes according to the checked data amount and whether the data is allowed to be divided into units of partitions. In this case, the plurality of data collecting and loading modes (or collecting and loading types) includes type 1, type 2A, type 2B, type 3A, type 3B, type 4, type 5, and the like. Further, the partitions may be set (or defined/distinguished) according to a period (including, e.g., year, month, day, etc.) for which data is loaded (or stored), a region (including, e.g., nation, administrative district (including, e.g., city, province, country, etc.), etc.), and the like.

Figure 2:
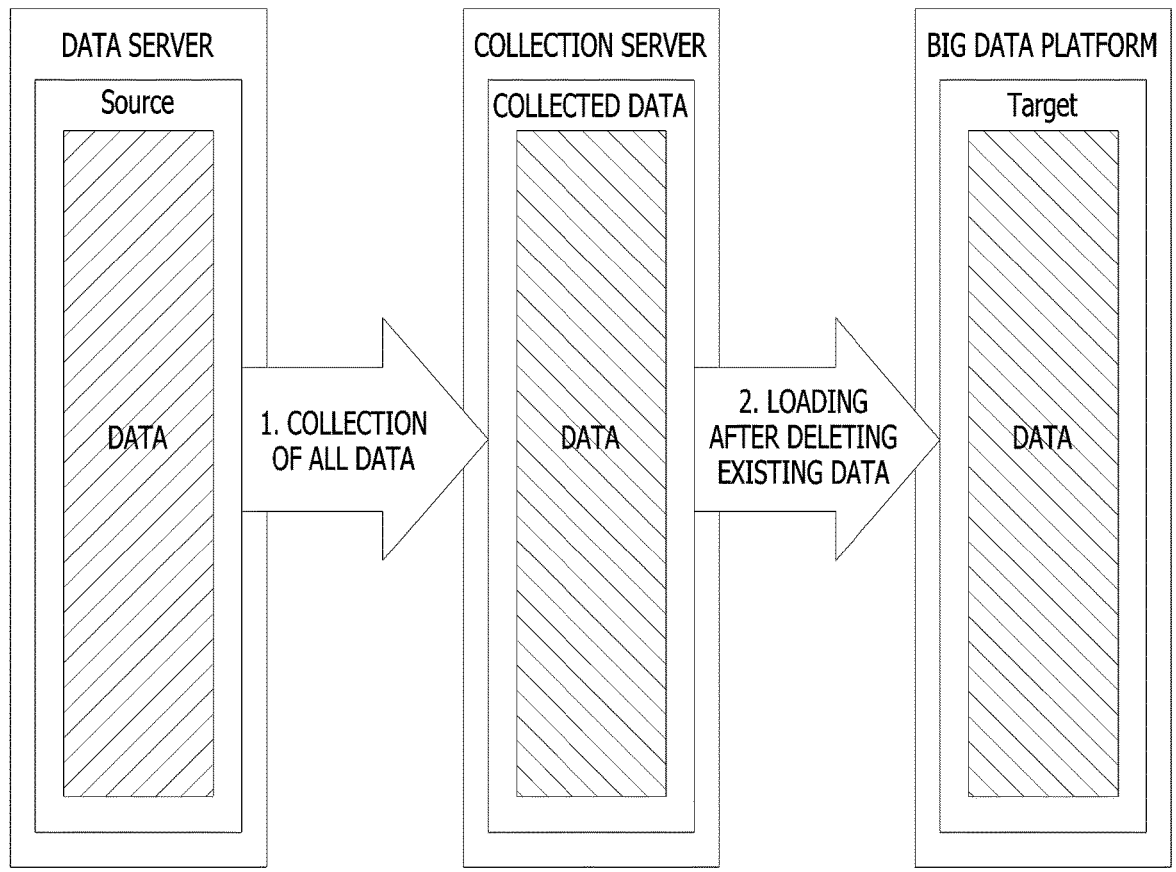
FIGS. 2 to 8 are diagrams illustrating examples of data collecting and loading modes according to an embodiment of the present invention.

Here, as illustrated in FIG. 2, the type 1 (or type 1 data connecting mode/fulldump type) is a mode in which all data of the data server 100 is collected in a preset collection area of the collection server 300, existing data of a final loading area of the big data platform 200 is deleted, and then the collected data is loaded into the big data platform 200.

Figure 3:
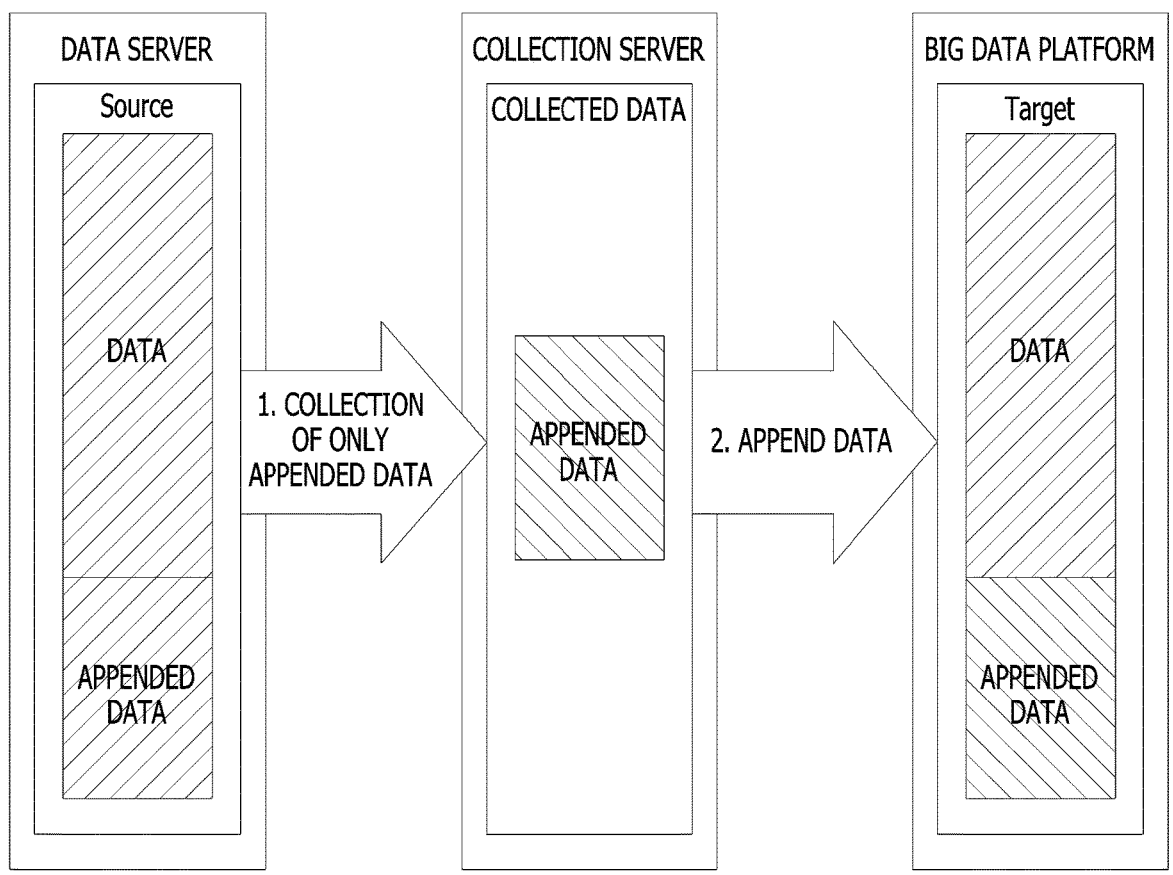

Further, as illustrated in FIG. 3, the type 2A (or type 2A data connecting mode/append type) is a mode in which only newly appended data of the data server 100 is collected in the collection area of the collection server 300, and the collected data is appended and loaded into the final loading area of the big data platform 200.

Figure 4:
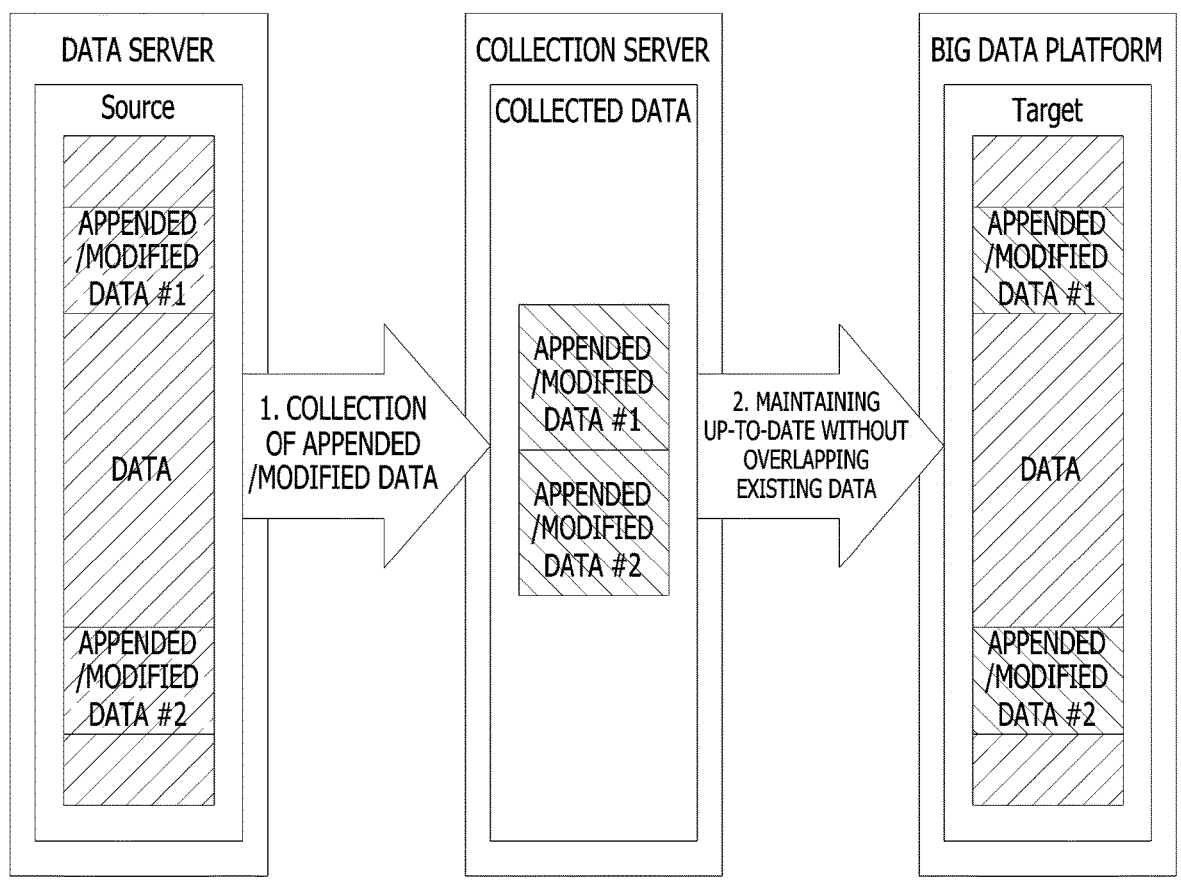

Further, as illustrated in FIG. 4, the type 2B (or type 2B data connecting mode/update type) is a mode in which only appended or modified data of the data server 100 is collected in the collection area of the collection server 300, and the collected data is loaded into the final loading area of the big data platform 200 using a preset primary key so as not to overlap basic data in a completion table included in the resource.

Figure 5:
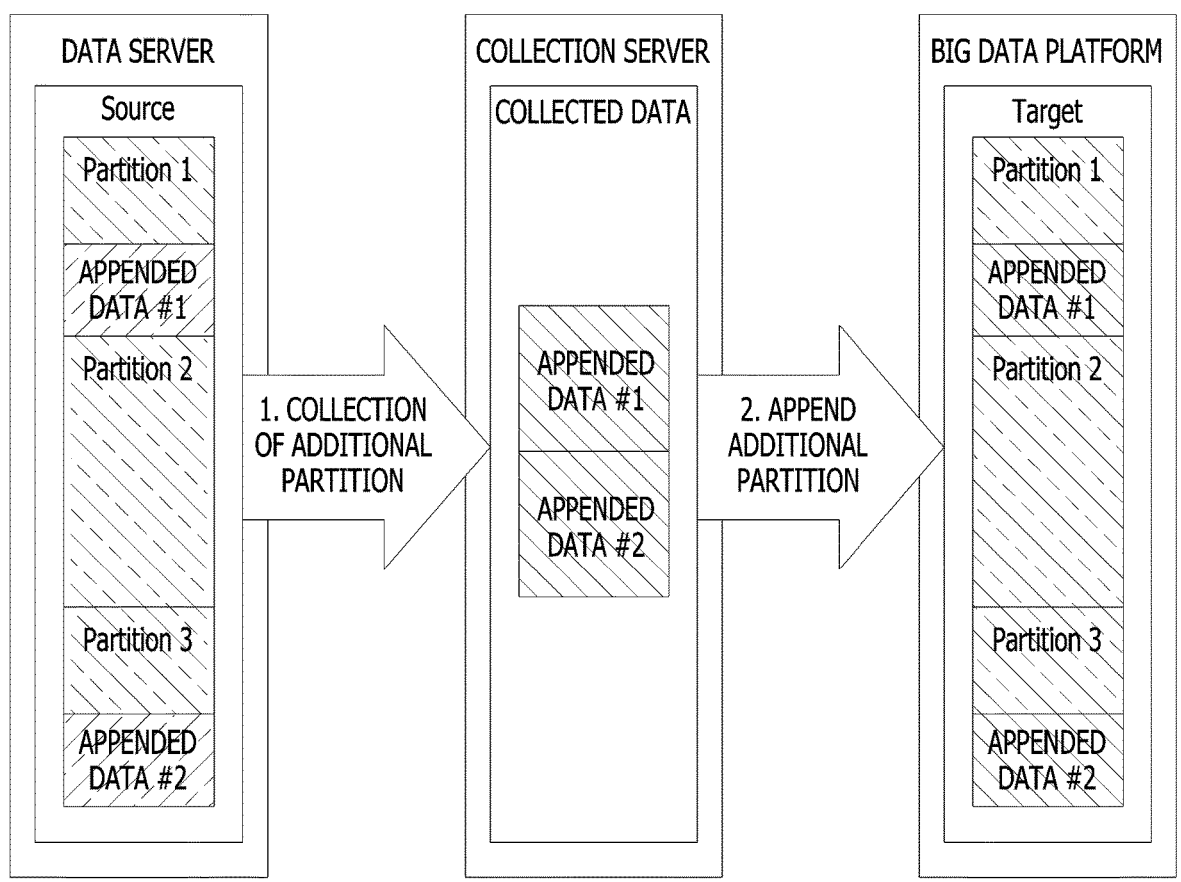

Further, as illustrated in FIG. 5, the type 3A (or type 3A data connecting mode/partial append type) is a mode in which a target area (or a target area of the big data platform 200) is composed of partitions, only data corresponding to a partition, in which appended data is present, among the partitions of the data server 100, is collected in the collection area of the collection server 300, and the collected data is appended and loaded into the final loading area of the big data platform 200.

Figure 6:
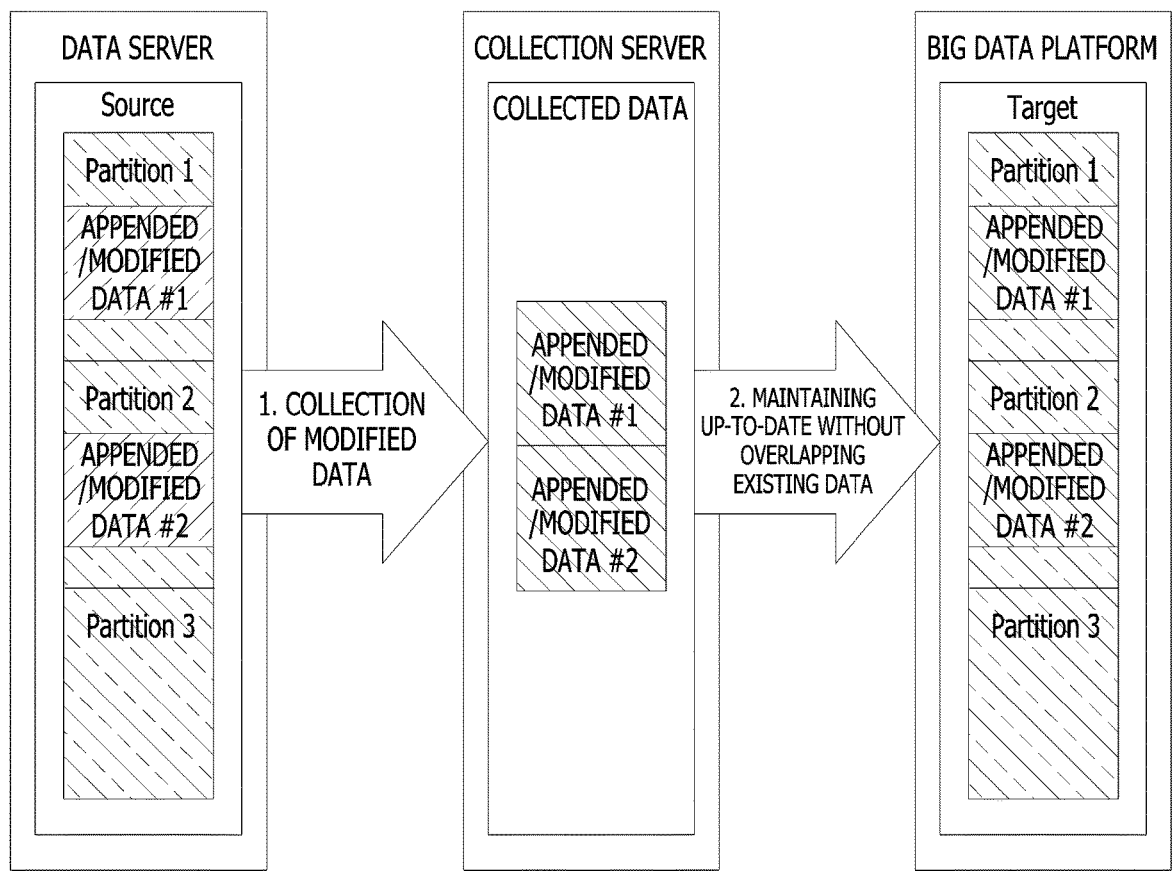

Further, as illustrated in FIG. 6, the type 3B (or type 3B data connecting mode/partial update type) is a mode in which the target area (or the target area of the big data platform 200) is composed of partitions, only data corresponding to a partition, in which appended or modified data is present, among the partitions of the data server 100, is collected in the collection area of the collection server 300, and the collected data is loaded into a partition in the final loading area of the big data platform 200 using the primary key so as not to overlap the existing data in the final loading area of the big data platform 200.

Figure 7:
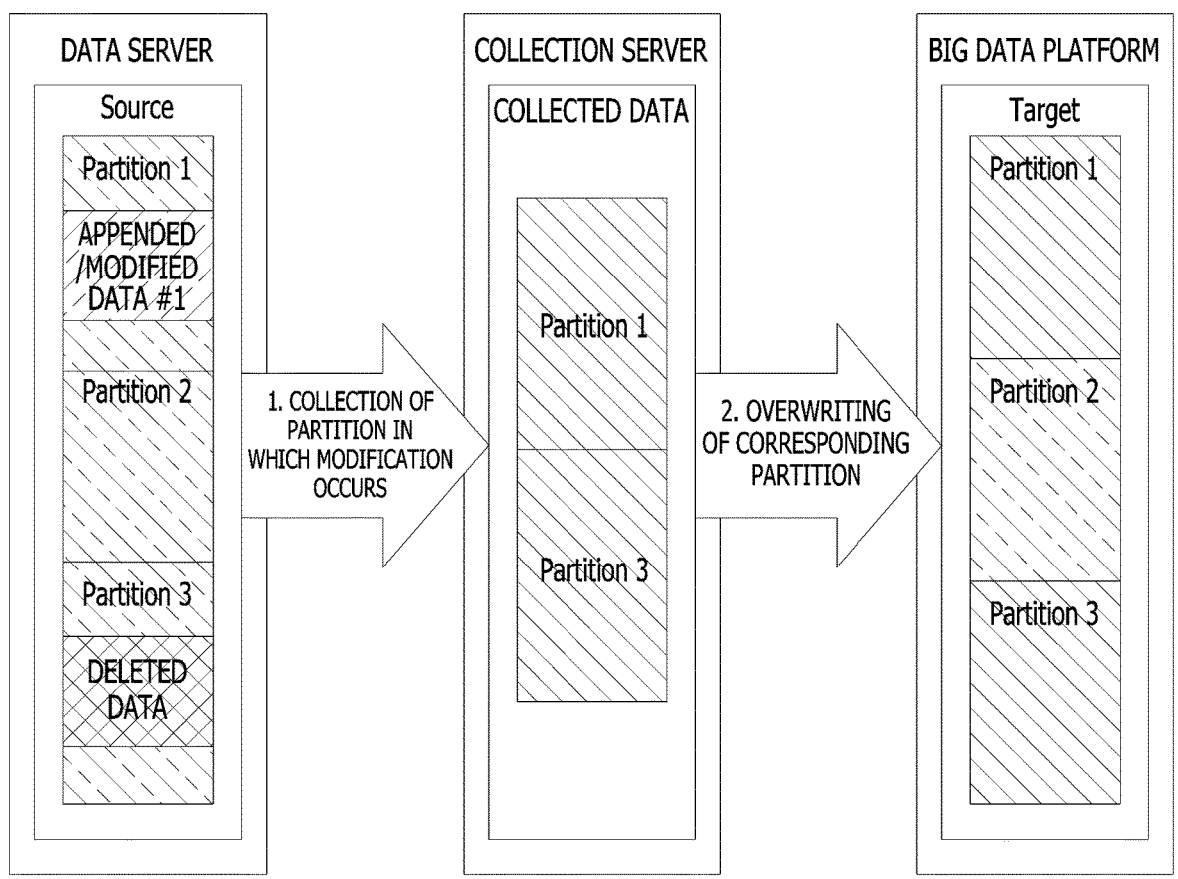

Further, as illustrated in FIG. 7, the type 4 (or type 4 data connecting mode/partition and remove type) is a mode in which the target area (or the target area of the big data platform 200) is composed of partitions, data corresponding to a partition, in which append or modification occurs, among the partitions of the data server 100, or data corresponding to a partition, in which deletion occurs, among the partitions of the data server 100, is collected in the collection area of the collection server 300, an amount of data in the final loading area of the big data platform 200 is checked, and when the checked amount of data in the final loading area of the big data platform 200 is smaller than a preset reference value (or a partition range of the data is smaller than a preset reference unit (e.g., three months)), the collected data is overwritten and loaded into the existing partition in the final loading area of the big data platform 200.

Figure 8:
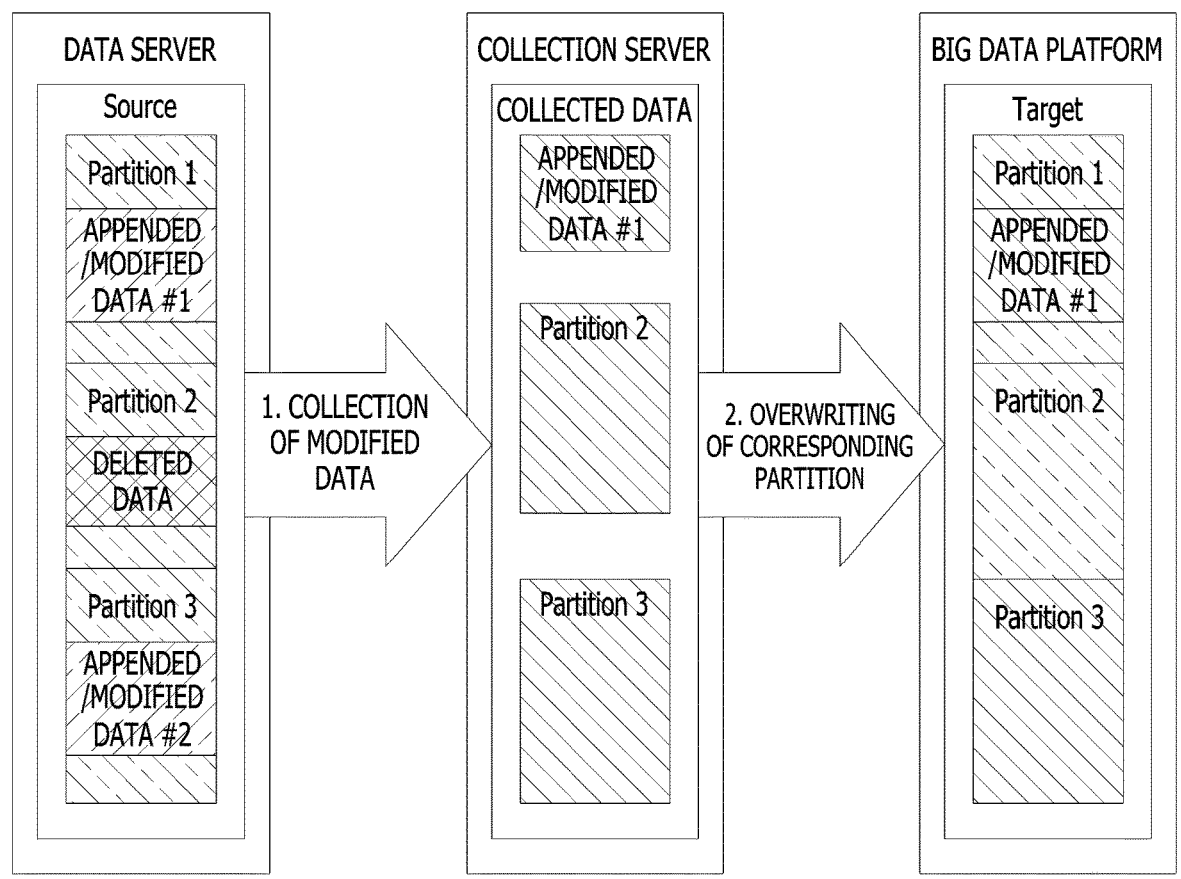

Further, as illustrated in FIG. 8, the type 5 (or type 5 data connecting mode/partition and complex type) is a mode in which data corresponding to a partition, in which append or modification occurs, among the partitions of the data server 100, or data corresponding to a partition, in which deletion occurs, among the partitions of the data server 100, is collected in the collection area of the collection server 300, an amount of data in the final loading area of the big data platform 200 is checked, and when the checked amount of data in the final loading area of the big data platform 200 is greater than or equal to a preset reference value (or the partition range of the data is greater than or equal to a preset reference unit (e.g., three months)), some pieces of the collected data are loaded into the final loading area of the big data platform 200 (or the collected data is loaded into the partition in the final loading area of the big data platform 200 using the primary key so as not to overlap the existing data in the final loading area of the big data platform 200) as the type 3B, and the remaining pieces of data of the collected data are loaded into the final loading area of the big data platform 200 (or the collected data is overwritten and loaded into the existing partition in the final loading area of the big data platform 200) as the type 4.

As described above, the criterion for classifying the type 1, the type 2A and the type 2B, the type 3A, the type 3B, the type 4, and the type 5 among the data collecting and loading modes may be whether the data may be divided into units of partitions.

Further, the collection server 300 delivers (or transmits) a data collection request to the data server 100.

That is, the collection server 300 delivers (or transmits) the data collection request to the data server 100 to collect the data in the determined data collecting and loading mode.

Further, the collection server 300 collects the data from the data server 100 in a preset collection area of the corresponding collection server 300 in the determined data collecting and loading mode.

That is, the collection server 300 collects a plurality of pieces of data (or tables) stored in the DBMS included in the data server 100 in the determined data collecting and loading mode using java database connectivity (JDBC) or open database connectivity (ODBC), which is preset, and stores (or temporarily stores/collects) the collected data in the collection area.

Further, the collection server 300 may collect logs or files stored in the data server 100 in the determined data collecting and loading mode using the file transfer protocol (FTP), an open source, a self-developed agent (not illustrated), or the like, which is preset, or may collect pieces of web data using web crawling or the like, and may store (or temporarily store/collect) the collected data in the collection area.

Further, the collection server 300 loads the collected data into the big data platform 200 on the basis of the determined data collecting and loading mode.

That is, the collection server 300 loads the collected data (or the collected data stored in the collection area) into the disk and/or the memory included in the big data platform 200 on the basis of the determined data collecting and loading mode.

Figure 9:
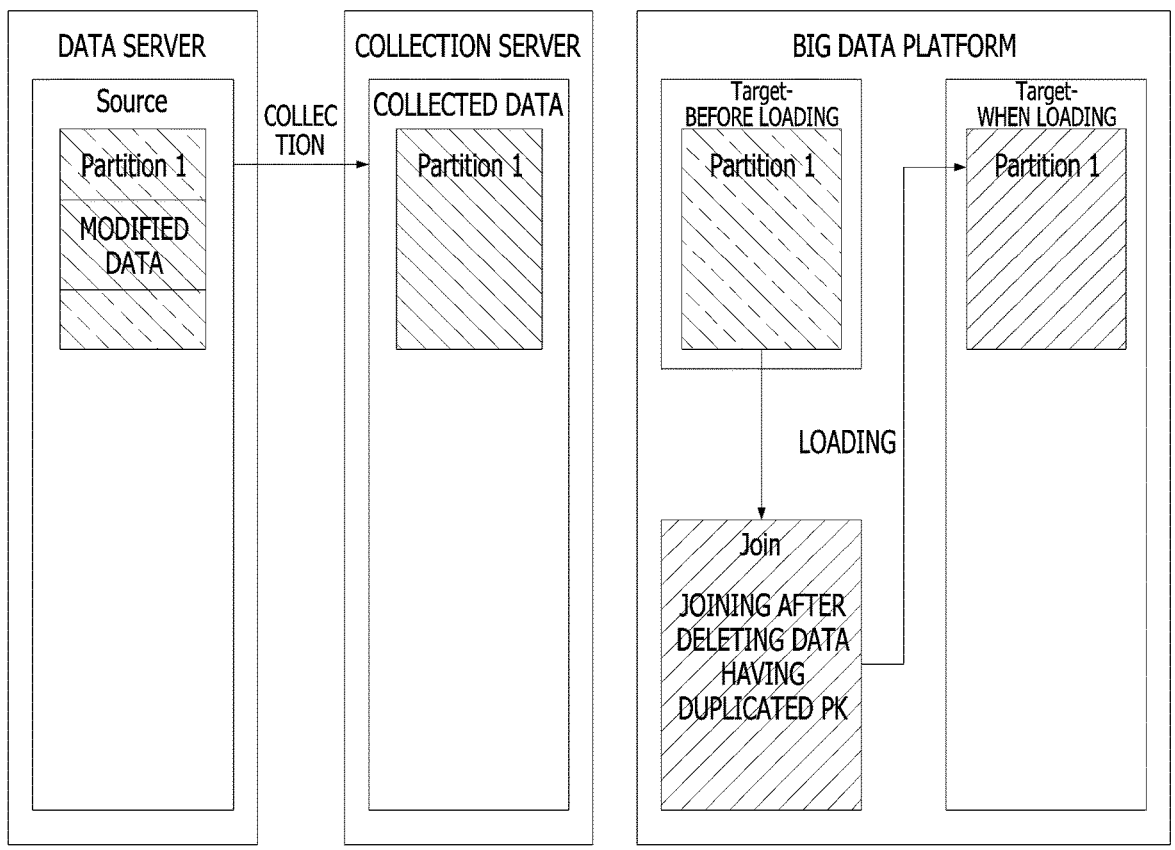
FIG. 9 is a diagram illustrating an example of data loading when an update function or a query is not supported according to an embodiment of the present invention.

In this case, in the case in which an update function or a query is not supported when the collection server 300 loads the collected data into the big data platform 200, the collection server 300 may join data in a final loading area of the big data platform 200 and the collected data, generate data in a new partition, and replace and load the generated data in the new partition into the big data platform 200, as illustrated in FIG. 9.

Figure 10:
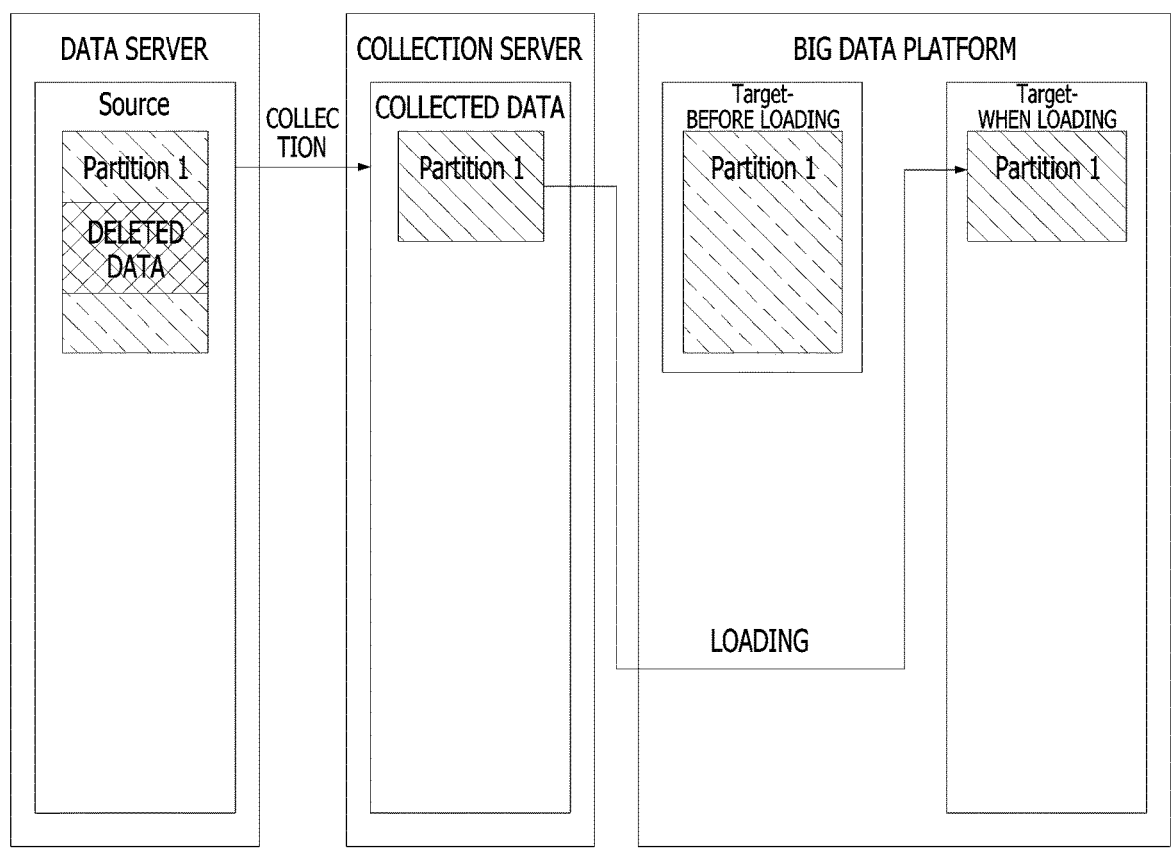
FIG. 10 is a diagram illustrating an example of data loading when a delete function or a query is not supported according to an embodiment of the present invention.

Further, in the case in which a delete function or a query is not supported when the collection server 300 loads the collected data into the big data platform 200, the collection server 300 may replace and load the data newly collected by the collection server 300 into a corresponding partition of the big data platform 200, as illustrated in FIG. 10.

In the embodiment of the present invention, the collection server 300 is described as being independently operated, but the present invention is not limited thereto, and the collection server 300 may be configured and operated in the big data platform 200 (or as a collection module included in the big data platform 200).

As described above, the collection server may check the states of the target resource before collecting the data, determine the data collecting and loading mode for the corresponding resource on the basis of the checked states of the resource, transmit the data collection request to the data server, collect the data from the data server in the determined data collecting and loading mode, and load the collected data into the big data platform.

Hereinafter, a data loading and processing method according to the present invention will be described in detail with reference to FIGS. 1 to 11.

Figure 11:
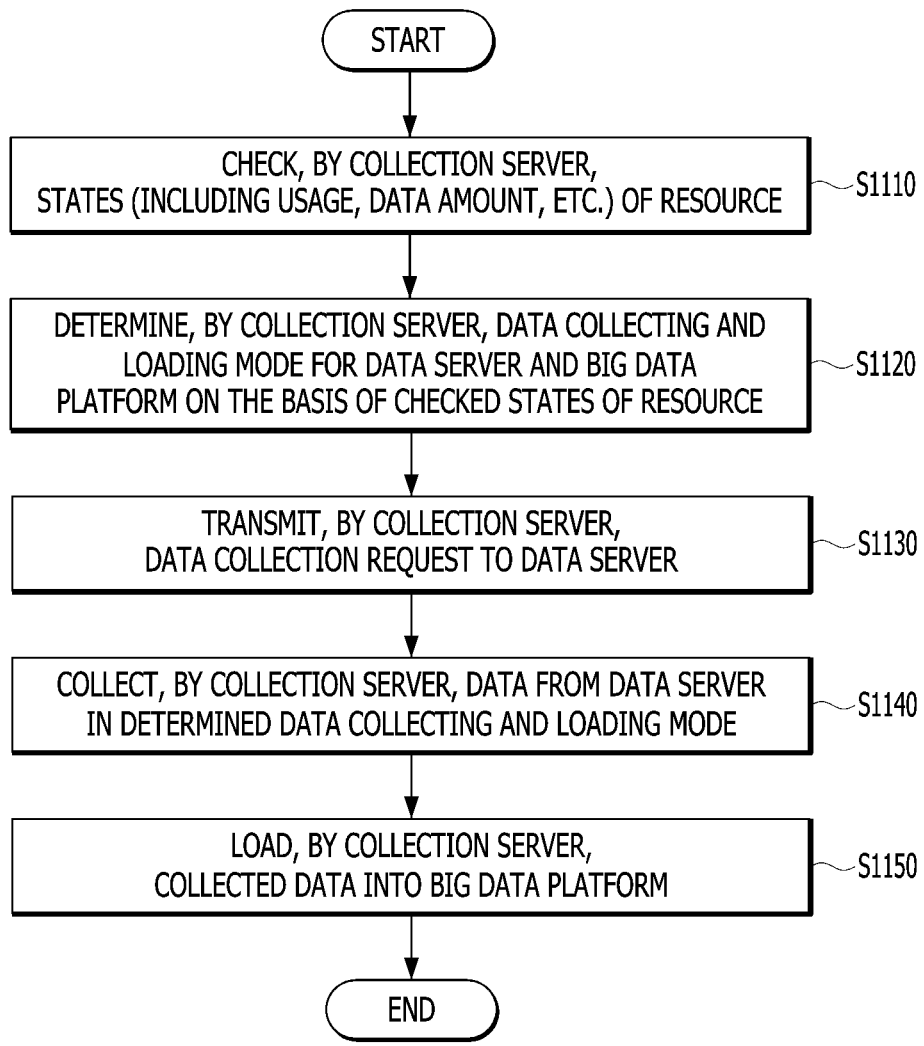
FIG. 11 is a flowchart illustrating a data loading and processing method according to an embodiment of the present invention.

FIG. 11 is a flowchart illustrating a data loading and processing method according to an embodiment of the present invention.

First, the collection server 300 checks the usage of the data server 100 and the big data platform 200 that are target resources, and a data amount of the data server 100. Here, the resources indicate the usage of the data server 100 that is a target from which data is collected, the usage of the big data platform 200 that is a target into which data is loaded, and a data amount of the target from which data is collected.

That is, the collection server 300 checks states including the usage of at least one of the CPU, the disk, and the memory which are included in each of the data server 100 and the big data platform 200.

Further, the collection server 300 checks a state including the data amount of the data server 100.

As an example, a first collection server 300 checks the usage of a first CPU, a first disk, and a first memory included in a first data server 100, and a data amount of the first data server.

Further, the first collection server checks the usage of a second CPU, a second disk, and a second memory included in a first big data platform 200.

As another example, a second collection server 300 checks the usage of the first CPU, the first disk, and the first memory included in the first data server 100, and the data amount of the first data server.

Further, the second collection server checks the usage of the second CPU, the second disk, and the second memory included in the first big data platform 200 (S1110).

Next, the collection server 300 determines a data collecting and loading mode for the data server 100 and the big data platform 200 on the basis of the checked states of the resources (e.g., the usage of the data server 100, the usage of the big data platform 200, the data amount of the data server 100, etc.) or the like.

That is, the collection server 300 determines (or selects) any one data collecting and loading mode from among a plurality of preset data collecting and loading modes according to the checked data amount and whether the data is allowed to be divided into units of partitions. In this case, the plurality of data collecting and loading modes (or collecting and loading types) includes type 1, type 2A, type 2B, type 3A, type 3B, type 4, type 5, and the like. Further, the partitions may be set (or defined/distinguished) according to a period (including, e.g., year, month, day, etc.) for which data is loaded (or stored), a region (including, e.g., nation, administrative district (including, e.g., city, province, country, etc.), etc.), and the like.

As an example, the first collection server determines the type 1 data collecting and loading mode among the plurality of preset data collecting and loading modes on the basis of the checked usage of the first CPU, the first disk, and the first memory included in the first data server, the checked data amount of the first data server, and the checked usage of the second CPU, the second disk, and the second memory included in the first big data platform.

As another example, the second collection server determines the type 3B data collecting and loading mode among the plurality of preset data collecting and loading modes on the basis of the checked usage of the first CPU, the first disk, and the first memory included in the first data server, the checked data amount of the first data server, and the checked usage of the second CPU, the second disk, and the second memory included in the first big data platform (S1120).

Thereafter, the collection server 300 delivers (or transmits) a data collection request to the data server 100.

That is, the collection server 300 delivers (or transmits) the data collection request to the data server 100 to collect the data in the determined data collecting and loading mode.

Further, the data server 100 receives the data collection request transmitted from the collection server 300, and stores the received data collection request.

As an example, the first collection server transmits a first data collection request to the first data server to collect the data from the first data server in the determined type 1 data collecting and loading mode.

Further, the first data server receives the first data collection request transmitted from the first collection server.

As another example, the second collection server transmits a second data collection request to the first data server to collect the data from the first data server in the determined type 3B data collecting and loading mode.

Further, the first data server receives the second data collection request transmitted from the second collection server (S1130).

Thereafter, the collection server 300 collects the data from the data server 100 in a preset collection area of the corresponding collection server 300 in the determined data collecting and loading mode.

That is, the collection server 300 collects a plurality of pieces of data (or tables) stored in the DBMS included in the data server 100 in the determined data collecting and loading mode using a preset JDBC or ODBC, which is preset, and stores (or temporarily stores/collects) the collected data in the collection area.

Further, the collection server 300 may collect logs or files stored in the data server 100 in the determined data collecting and loading mode using the FTP, an open source, a self-developed agent (not illustrated), or the like, which is preset, or may collect pieces of web data using a web crawling or the like, and may store (or temporarily store/collect) the collected data in the collection area.

As an example, the first collection server collects all data stored in a DBMS included in the first data server using JDBC in the determined type 1 data collecting and loading mode, and stores all collected data in a first collection area of the first collection server.

As another example, the second collection server collects only appended or modified data of partitions among all data stored in the DBMS included in the first data server using the JDBC in the determined type 3B data collecting and loading mode, and stores the collected appended or modified data in a second collection area of the second collection server (S1140).

Thereafter, the collection server 300 loads the collected data into the big data platform 200 on the basis of the determined data collecting and loading mode.

That is, the collection server 300 loads the collected data (or the collected data stored in the collection area) into the disk and/or the memory included in the big data platform 200 on the basis of the determined data collecting and loading mode.

In this case, in the case in which an update function or a query is not supported when the collection server 300 loads the collected data into the big data platform 200, the collection server 300 may join data in a final loading area of the big data platform 200 and the collected data, generate data in a new partition, and replace and load the generated data in the new partition into the big data platform 200, as illustrated in FIG. 9.

Further, in the case in which a delete function or a query is not supported when the collection server 300 loads the collected data into the big data platform 200, the collection server 300 may replace and load the data newly collected by the collection server 300 into a corresponding partition of the big data platform 200, as illustrated in FIG. 10.

As an example, the first collection server loads all collected data stored in the DBMS into the second disk included in the first big data platform on the basis of the determined type 1 data collecting and loading mode.

As another example, the second collection server loads the collected appended or modified data into the second disk included in the first big data platform on the basis of the determined type 3B data collecting and loading mode (S1150).

According to the embodiment of the present invention, as described above, a collection server can check a state of a target resource before collecting data, determine a data collecting and loading mode for the corresponding resource on the basis of the checked state of the resource, transmit a data collection request to a data server, collect data from the data server in the determined data collecting and loading mode, and load the collected data into a big data platform, and thus the data can be collected and loaded by the optimal data collecting and loading mode in accordance with current states of a target to be collected and a target to be loaded so as to enhance the operation efficiency of the entire system.

It will be understood by those of skilled in the art that various changes and modifications in form and details may be made without departing from the spirit and scope of the present invention. Therefore, the embodiments disclosed in the present invention should be considered in a descriptive sense only and not for purposes of limitation. The scope of the present invention is defined not by the detailed description of the present invention but by the appended claims, and encompasses all modifications and equivalents that fall within the scope of the appended claims.

Mode of the Invention

Modes of the invention have been described together in the above Best mode of the Invention.

INDUSTRIAL APPLICABILITY

The present invention has industrial applicability because a collection server can check a state of a target resource before collecting data, determine a data collecting and loading mode for the corresponding resource on the basis of the checked state of the resource, transmit a data collection request to a data server, collect data from the data server in the determined data collecting and loading mode, and load the collected data into a big data platform, and thus the data can be collected and loaded by the optimal data collecting and loading mode in accordance with current states of a target to be collected and a target to be loaded so as to enhance the operation efficiency of the entire system.

The invention claimed is:

1. A data loading and processing system comprising:
a data server that is included in a resource and is a target from which data is collected;
a big data platform that is included in the resource and is a target into which data is loaded; and
a collection server comprising a memory storing instructions and a processor communicatively coupled to the memory, wherein the processor is configured to execute the instructions to:
check states including usage of the resource and a data amount;
determine a data collecting and loading mode for the data server and the big data platform based on the checked states of the resource;
transmit a data collection request to the data server;
collect data from the data server in a preset collection area of the collection server in the determined data collecting and loading mode;
divide the collected data into one or more partitions based on at least one of a time period and a region; and
load the collected data into the big data platform based on the determined data collecting and loading mode,
wherein the data server is configured to receive the data collection request transmitted from the collection server and store the received data collection request,
wherein the collection server is further configured to check the states comprises to check usage of the data server, a data amount of the data server, and usage of the big data platform, and
wherein to load the collected data into the big data platform comprises to load the collected data into at least one of a disk and a memory included in the big data platform based on the determined data collecting and loading mode.

2. The data loading and processing system of claim 1, wherein, in a case in which an update function or a query is not supported when the collection server loads the collected data into the big data platform, the collection server joins data in a final loading area of the big data platform and the collected data, generates data in a new partition, and replaces and loads the generated data in the new partition into the big data platform.

3. The data loading and processing system of claim 1, wherein, in a case in which a delete function or a query is not supported when the collection server loads the collected data into the big data platform, the collection server replaces and loads data newly collected by the collection server into a corresponding partition of the big data platform.

4. A data loading and processing method comprising:
checking, by a collection server, states including usage of a resource and a data amount;
determining, by the collection server, a data collecting and loading mode for a data server and a big data platform based on the checked states of the resource;
transmitting, by the collection server, a data collection request to the data server;
receiving, by the data server, the data collection request transmitted from the collection server and storing the received data collection request;
collecting, by the collection server, data from the data server in a preset collection area of the collection server in the determined data collecting and loading mode;
dividing the collected data into one or more partitions based on at least one of a time period and a region; and
loading, by the collection server, the collected data into the big data platform based on the determined data collecting and loading mode,
wherein the checking, by the collection server, of the states including usage of the resource and a data amount, comprises checking usage of the data server, a data amount of the data server, and usage of the big data platform, and
wherein the loading, by the collection server, the collected data into the big data platform based on the determined data collecting and loading mode, comprises loading the collected data into at least one of a disk and a memory included in the big data platform based on the determined data collecting and loading mode.

5. The data loading and processing method of claim 4, wherein, in the determining of the data collecting and loading mode for the data server and the big data platform, any one data collecting and loading mode is determined from among a plurality of preset data collecting and loading modes according to the checked data amount and whether the data is allowed to be divided into units of partitions.

6. The data loading and processing method of claim 4, wherein the data collecting and loading mode is any one of a preset type 1, type 2A, type 2B, type 3A, type 3B, type 4, and type 5, the type 1 is a mode in which all data of the data server is collected in the preset collection area of the collection server, existing data in a final loading area of the big data platform is deleted, and then the collected data is loaded into the big data platform, the type 2A is a mode in which only newly appended data of the data server is collected in the preset collection area of the collection server, and the collected data is appended and loaded into the final loading area of the big data platform, the type 2B is a mode in which only appended or modified data of the data server is collected in the preset collection area of the collection server, and the collected data is loaded into the final loading area of the big data platform using a preset primary key so as not to overlap basic data in a completion table included in the resource, the type 3A is a mode in which a target area is composed of partitions, only data corresponding to a partition, in which appended data is present, among the partitions of the data server, is collected in the preset collection area of the collection server, and the collected data is appended and loaded into the final loading area of the big data platform, the type 3B is a mode in which the target area is composed of partitions, only data corresponding to a partition, in which appended or modified data is present, among the partitions of the data server, is collected in the preset collection area of the collection server, and the collected data is loaded into a partition in the final loading area of the big data platform using the preset primary key so as not to overlap the existing data in the final loading area of the big data platform, the type 4 is a mode in which the target area is composed of partitions, data corresponding to a partition, in which append or modification occurs, among the partitions of the data server, or data corresponding to a partition, in which deletion occurs, among the partitions of the data server, is collected in the preset collection area of the collection server, an amount of data in the final loading area of the big data platform is checked, and when the checked amount of data in the final loading area of the big data platform is smaller than a preset reference value, the collected data is overwritten and loaded into an existing partition in the final loading area of the big data platform, and the type 5 is a mode in which data corresponding to a partition, in which append or modification occurs, among the partitions of the data server, or data corresponding to the partition, in which deletion occurs, among the partitions of the data server, is collected in the preset collection area of the collection server, the amount of data in the final loading area of the big data platform is checked, and when the checked amount of data in the final loading area of the big data platform is greater than or equal to the preset reference value, some pieces of data of the collected data are loaded into the final loading area of the big data platform as the type 3B, and remaining pieces of data of the collected data are loaded into the final loading area of the big data platform as the type 4.

7. The data loading and processing method of claim 4, wherein the collecting of the data from the data server in the preset collection area of the collection server in the determined data collecting and loading mode includes at least one of:

a process of collecting a plurality of pieces of data stored in a database management system (DBMS) included in the data server using java database connectivity (JDBC) or open database connectivity (ODBC), which is preset, in the determined data collecting and loading mode;

a process of collecting logs and files stored in the data server using at least one of the file transfer protocol (FTP), an open source, and an agent, which are preset, in the determined data collecting and loading mode; and a process of collecting pieces of web data using web crawling in the determined data collecting and loading mode.

8. The data loading and processing method of claim 4, wherein the loading of the collected data into the big data platform based on the determined data collecting and loading mode includes:

in a case in which an update function or a query is not supported when the collection server loads the collected data into the big data platform, a process of joining, by the collection server, data in a final loading area of the big data platform and the collected data and generating data in a new partition; and a process of replacing and loading the generated data in the new partition into the big data platform.

* * * * *